P. FÄSZLER.
ELECTRIC WELDING MACHINE.
APPLICATION FILED JULY 7, 1915.

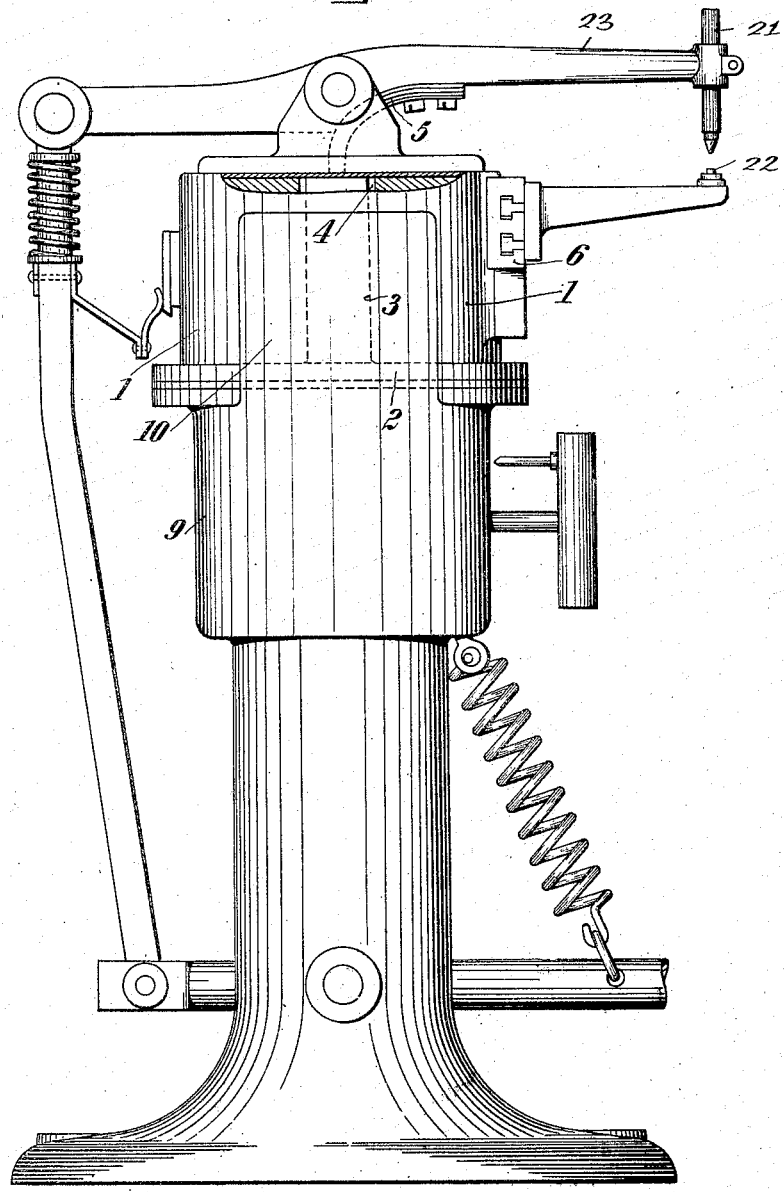

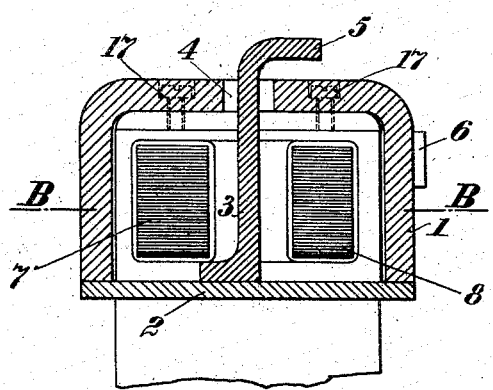
Fig. 2. A-A
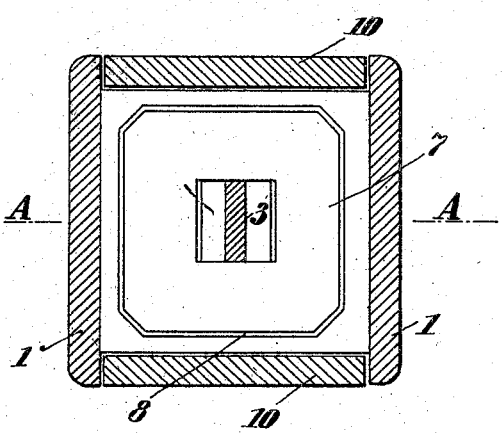
Fig. 3. B-B

1,213,174.

Patented Jan. 23, 1917.
3 SHEETS—SHEET 3.

Inventor:
Peter Fäszler
by his attorneys

UNITED STATES PATENT OFFICE.

PETER FÄSZLER, OF BERLIN-FRIEDENAU, GERMANY.

ELECTRIC WELDING-MACHINE.

1,213,174.  Specification of Letters Patent. Patented Jan. 23, 1917.

Application filed July 7, 1915. Serial No. 38,449.

*To all whom it may concern:*

Be it known that I, PETER FÄSZLER, a citizen of Switzerland, residing at Berlin-Friedenau, Germany, have invented certain new and useful Improvements in Electric Welding-Machines, of which the following is a specification.

The present invention relates to an electric welding machine, and in particular to the arrangement of the transformer thereof. It is known to provide, in such machines, the transformer with one single secondary winding, which at the same time is disposed as a casing for the transformer. However, for obtaining the necessary mechanical strength such casing must be made much too heavy with regard to its electric duty. As the material, of which such casing is made, must be copper, bronze or a similar material, in order to offer a good conductor to the current, a transformer of this design becomes too expensive.

The welding machine forming the subject matter of the present invention has a transformer which affords the same advantages as the transformer hereinbefore mentioned, but is considerably cheaper in its construction.

Instead of making the whole transformer casing of the expensive material the guard cover of the transformer is essentially formed by the base frame which may be made of a cheaper material such as common cast iron by parts having the shape of a jacket projecting upward from the said base frame and being complemented to a complete jacket by active parts of the transformer itself. Preferably the jacket forming projections of the base are complemented to the complete jacket by the secondary winding of the transformer. In consequence of such arrangement only so much copper or bronze material is required for the secondary winding as is actually necessary for the electrical duty of the machine. As, furthermore, with such arrangement the material, which is a good conductor to heat, comes in direct contact with the atmosphere, a good and efficient cooling of the same is insured. According to the form of the transformer the jacketlike parts of the base may also be complemented to a complete closed jacket by parts of the iron core. This will be advisable, as a rule, when the secondary coil of the transformer consists of more than one winding which is then less well suited for forming the complementing portion of the jacket.

In the accompanying drawing the invention has been exemplified in various constructional forms and views.

Figure 4:
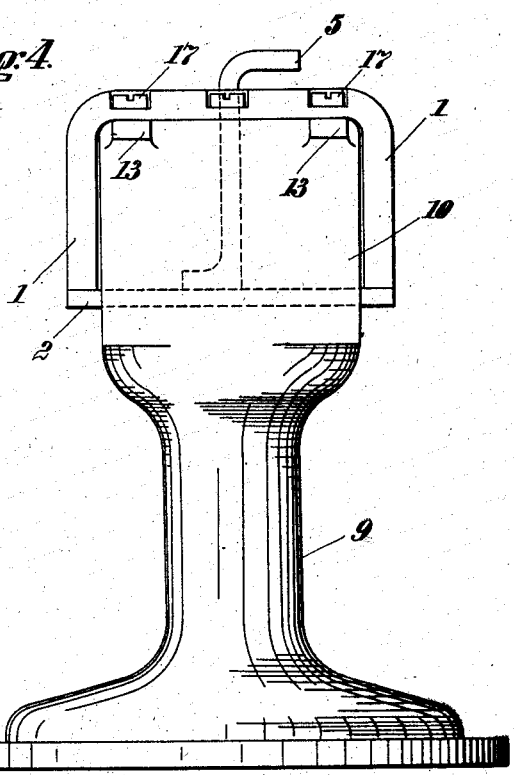
Figure 5:
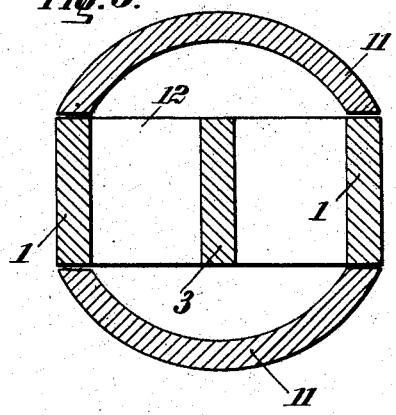
Figure 6:
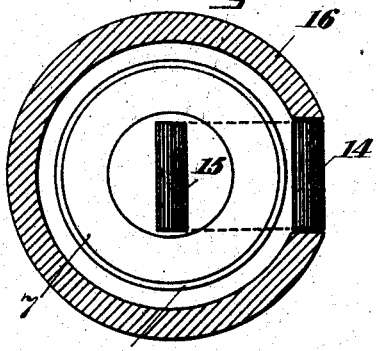

Figure 1 is a side elevation of the whole machine. Fig. 2, a section on line A—A Fig. 3; Fig. 3, a section on line B—B, Fig. 2; Fig. 4, a side elevation. Figs. 5 and 6 are diagrams showing horizontal sections through another constructional form of the invention.

In the constructional form according to Figs. 1-4 the secondary coil is essentially formed by a U-shaped member 1 which is invertedly, that is to say with its opening downward, secured to a plate 2 likewise made of a material which is a good conductor for the electric current. In the middle of the plate an I-shaped part 3 is secured which projects through an opening 4 in the apex of the U-shaped member 1. The current flows in the single-winding secondary coil formed by the parts 1, 2 and 3 from the end 5 through the I-part 3 and then parallel branched through the plate 2 and the two legs of the U-member 1 to point 6. At 5, as shown in the drawing Fig. 1, the welding electrode 21 operated by lever 23 is fitted, while the stationary or lower welding electrode 22 is fitted at 6. As may be seen from Fig. 3, it has been assumed that the sides of the legs of the U-member 1 are flat, and therefore also the base plate has been made of a rectangular shape. The body thus produced which contains in its cavity the transformer core 7 with the primary coil encircling it, 8, forms a casing which is not completely closed as there are wide openings in front and at the back. This cavity is closed by jacket-forming parts 10 projecting upward from the base 9 into the gaps in the jacket-body and fitting closely against the legs of the U-member 1. The diagram in Fig. 3 shows the thus obtained guard cover or jacket of the transformer in a horizontal section. The parts 10 at the same time serve as means for fixing the transformer, for example by aid of ears 13 on the said parts 10 on which the transformer bears. For further securing the latter screws 17 may be passed through these parts. The transformer may also bear with its base 2 on the edges of the base frame as shown in Fig. 1.

Instead of making the jacket or casing of a rectangular shape, the same may also be made of a rounded shape by curved jacket-forming parts 11 fitting against the legs of the U-member as illustrated in the diagram, Fig. 5. Otherwise this constructional form is identical with that described above and shown in Fig. 1. In place of the plate 2 also a bottom yoke 12 may be employed, onto which, then, the U-shaped part 1 and the I-shaped part 3 are fitted. The secondary coil may also, instead of solid pieces, be composed of sheet metal sections, whereby its manufacture is facilitated.

In Fig. 6 a further simplified constructional form of the invention is shown. Here a secondary coil is employed which consists only of one side member 14 and a central member 15, corresponding to the I-shaped part 3, and which is encircled by the transformer core 7 with the primary coil 8. The part 14 forms the complement of the jacket 16 which extends through three quarters of the circumference of the jacket 16. This construction, in particular, shows how great a saving in expensive material may be obtained according to the present invention. In this case it is also of advantage to make the secondary coil of a plurality of sheet metal sections.

When the cover of the transformer is complemented by means of the iron core, the arrangement may remain in other points the same as hereinbefore described. In this case, for example, the parts 1, 12 and 3 in Fig. 5 would form the magnetic part, the iron core of the transformer, while the winding could be arranged around the core part 3. By such means the same object is attained, that the principal parts of the transformer are inclosed by a jacket. For insuring a good cooling, slots may be provided in the jacket members, which allow of the air passing into the interior of the transformer.

I claim:

1. In an electric welding machine a transformer, the protecting case of said transformer consisting of parts of electrically non-active material, said parts forming the greater part of the transformer case, said case completed to a fully closed case by parts of the secondary coil of the transformer by these filling up the intervals between the said non-active parts.

2. In an electric welding machine a transformer, the protecting case of said transformer consisting of jacket-forming parts of electrically non-active material, said parts forming the greater part of the transformer case, said case completed to a fully closed case by parts of the secondary coil of the transformer by these filling up the intervals between the said jacket-forming parts.

3. In an electric welding machine a transformer, the protecting case of said transformer consisting of jacket-forming parts of electrically non-active material extending upward from the base of the welding machine, said parts forming the greater part of the transformer case, said case completed to a fully closed case by parts of the secondary coil of the transformer by these filling up the intervals between the said jacket-forming parts.

4. In an electric welding machine a transformer, the protecting case of said transformer consisting of two jacket-forming parts of electrically non-active material, said parts forming the greater part of the transformer case and leaving two gaps, said two gaps filled up by the outer parts of the two-conductor secondary coil completing the said jacket-forming parts to a fully closed transformer jacket.

5. In an electric welding machine a transformer, the protecting case of said transformer consisting of one integral jacket-forming part of electrically non-active material extending through three quarters of the circumference, said part forming the greater part of the transformer case by leaving one gap, said gap filled up by the outer part of the single conductor secondary coil completing the said jacket-forming part to a fully closed transformer jacket.

In testimony whereof I affix my signature.

PETER FÄSZLER.